(12) United States Patent
Huang et al.

(10) Patent No.: US 11,321,283 B2
(45) Date of Patent: *May 3, 2022

(54) TABLE AND INDEX COMMUNICATIONS CHANNELS

(71) Applicant: Amazon Technologies, Inc., Seattle, WA (US)

(72) Inventors: Xianglong Huang, Bellevue, WA (US); Yijun Lu, Kenmore, WA (US); Wei Xiao, Bellevue, WA (US); Jiandan Zheng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/276,413

(22) Filed: Feb. 14, 2019

(65) Prior Publication Data

US 2019/0179807 A1   Jun. 13, 2019

Related U.S. Application Data

(63) Continuation of application No. 14/182,258, filed on Feb. 17, 2014, now Pat. No. 10,216,768.

(51) Int. Cl.
*G06F 16/20*   (2019.01)
*G06F 16/21*   (2019.01)
(Continued)

(52) U.S. Cl.
CPC .............. *G06F 16/21* (2019.01); *G06F 16/22* (2019.01); *G06F 16/278* (2019.01)

(58) Field of Classification Search
None
See application file for complete search history.

(56) References Cited

U.S. PATENT DOCUMENTS 6,785,696 B2   8/2004   Mosher, Jr. et al.
7,558,883 B1   7/2009   Lamport
(Continued)

FOREIGN PATENT DOCUMENTS

CN   101089857 A   12/2007
CN   103077222 A   5/2013
(Continued)

OTHER PUBLICATIONS

Japanese Notice of Reasons for Refusal dated Mar. 22, 2021, Patent Application No. 2018-207253, 24 pages.
(Continued)

*Primary Examiner* — Jau Shya Meng
(74) *Attorney, Agent, or Firm* — Davis Wright Tremaine LLP

(57) ABSTRACT

One or more table partitions may communicate with an index partition that may be a master of a replication group. A communications channel may exist between table partitions and the index partition. Upon splitting the index partition, communications between the table partitions and the index partition may be suspended. Upon completion of the split, communications may be reestablished between the table partitions and a partition, of the replication group of index partitions, designated to be a master following the split. Messages accumulated by the table partitions during the split may be sent to the index partition upon reestablishing communications.

20 Claims, 8 Drawing Sheets

(51) Int. Cl.
*G06F 16/22* (2019.01)
*G06F 16/27* (2019.01)

(56) References Cited

U.S. PATENT DOCUMENTS

| | | | |
|---|---|---|---|
| 7,685,109 | B1 | 3/2010 | Ransil et al. |
| 8,046,327 | B2 | 10/2011 | Brodersen et al. |
| 8,090,710 | B2 | 1/2012 | Barsness et al. |
| 8,380,702 | B2 | 2/2013 | Baby et al. |
| 8,386,540 | B1 | 2/2013 | McAlister et al. |
| 8,417,679 | B1 | 4/2013 | Lyle et al. |
| 8,601,000 | B1 | 12/2013 | Stefani et al. |
| 8,650,155 | B2 | 2/2014 | Corbin et al. |
| 8,666,939 | B2 | 3/2014 | O'Krafka et al. |
| 8,667,001 | B2 | 3/2014 | Dinker et al. |
| 9,489,434 | B1 | 11/2016 | Rath |
| 2002/0184239 | A1 | 12/2002 | Mosher et al. |
| 2003/0101183 | A1* | 5/2003 | Kabra ............... G06F 16/2308 |
| 2005/0138081 | A1 | 6/2005 | Alshab et al. |
| 2006/0015490 | A1 | 1/2006 | Denuit et al. |
| 2006/0179147 | A1 | 8/2006 | Tran et al. |
| 2007/0162462 | A1 | 7/2007 | Zhang et al. |
| 2007/0220067 | A1 | 9/2007 | Suriyanarayanan et al. |
| 2007/0282915 | A1 | 12/2007 | Vosshall et al. |
| 2007/0286097 | A1 | 12/2007 | Davies |
| 2008/0052784 | A1 | 2/2008 | Wiley et al. |
| 2009/0019093 | A1 | 1/2009 | Brodersen et al. |
| 2009/0157776 | A1 | 6/2009 | McGarvey |
| 2009/0210429 | A1 | 8/2009 | Agrawal et al. |
| 2009/0217274 | A1 | 8/2009 | Corbin et al. |
| 2009/0240664 | A1 | 9/2009 | Dinker et al. |
| 2009/0265306 | A1 | 10/2009 | Barsness et al. |
| 2010/0036894 | A1 | 2/2010 | Senda et al. |
| 2010/0082630 | A1 | 4/2010 | Zagelow et al. |
| 2010/0191713 | A1 | 7/2010 | Lomet et al. |
| 2011/0313973 | A1 | 12/2011 | Srivas et al. |
| 2011/0320403 | A1 | 12/2011 | O'Krafka et al. |
| 2012/0005154 | A1 | 1/2012 | George et al. |
| 2012/0016881 | A1 | 1/2012 | Hrle et al. |
| 2012/0259889 | A1 | 10/2012 | Dinker et al. |
| 2013/0151535 | A1 | 6/2013 | Dusberger et al. |
| 2013/0159283 | A1* | 6/2013 | Broil ............... G06F 16/24539 707/716 |
| 2013/0238628 | A1 | 9/2013 | Behnen et al. |
| 2013/0290249 | A1 | 10/2013 | Merriman et al. |
| 2013/0290375 | A1* | 10/2013 | Anderson ........... G06F 16/2246 707/797 |
| 2013/0311488 | A1* | 11/2013 | Erdogan ............. G06F 16/2322 707/752 |
| 2013/0332484 | A1* | 12/2013 | Gajic .................. G06F 16/20 707/770 |
| 2014/0136802 | A1 | 5/2014 | Becker-Szendy et al. |
| 2014/0282613 | A1 | 9/2014 | Jea et al. |

FOREIGN PATENT DOCUMENTS

| | | |
|---|---|---|
| EP | 1498815 A2 | 1/2005 |
| JP | H11327982 A | 11/1999 |
| JP | 2001043119 A | 2/2001 |
| JP | 2007164523 A | 6/2007 |
| JP | 2010039746 A | 2/2010 |
| WO | 2012162176 A2 | 11/2012 |

OTHER PUBLICATIONS

Chinese First Office Action dated Mar. 28, 2018, Patent Application No. 201480035906.5, filed May 19, 2014, 13 pages.
Chinese Notice of Allowance dated Feb. 3, 2020, Patent Application No. 201480035906.5, filed May 19, 2014, 4 pages.
Chinese Rejection Decision dated Jul. 26, 2019, Patent Application No. 201480035906.5, filed May 19, 2014, 8 pages.
Chinese Second Office Action dated Jan. 30, 2019, Patent Application No. 201480035906.5, filed May 19, 2014, 11 pages.
European Communication pursuant to Article 94(3) EPC dated Jul. 27, 2018, Patent Application No. 14800362.7, filed May 19, 2014, 7 pages.
European Extended Search Report dated Jan. 19, 2017, Patent Application No. 14800362.7, filed May 19, 2014, 10 pages.
Indian First Examination Report dated Feb. 18, 2020, Patent Application No. 11501/DELNP/2015, filed May 19, 2014, 6 pages.
International Search Report and Written Opinion dated Oct. 7, 2014, International Patent Application No. PCT/US2014/038640, filed May 19, 2014, 16 pages.
Japanese Decision of Refusal dated Jul. 2, 2018, Patent Application No. 2016-514993, filed May 19, 2014, 2 pages.
Japanese Decision of Refusal dated May 7, 2020, Patent Application No. 2018-207253, 11 pages.
Japanese Office Action dated Sep. 2, 2019, Patent Application No. 2018-207253, filed May 19, 2014, 7 pages.
Japanese Office Action dated Dec. 6, 2021, Patent Application No. 2020-150062, 3 pages.
Japanese Trial/Appeal Decision dated Dec. 30, 2021, Patent Application No. 2018-207253, 63 pages.

* cited by examiner

TABLE AND INDEX COMMUNICATIONS CHANNELS

CROSS-REFERENCE TO RELATED APPLICATIONS

This application is a continuation of U.S. patent application Ser. No. 14/182,258, filed on Feb. 17, 2014, entitled "TABLE AND INDEX COMMUNICATIONS CHANNELS," which is incorporated herein by reference. This application is also related by subject matter to that which is disclosed in the following commonly assigned applications: U.S. patent application Ser. No. 13/898,151, entitled "INDEX UPDATE PIPELINE," filed on May 20, 2013, and U.S. patent application Ser. No. 14/182,248, entitled "TABLE AND INDEX COMMUNICATIONS CHANNELS," filed on Feb. 17, 2014, the entireties of which are hereby incorporated by reference herein.

BACKGROUND

A distributed database management system ("DBMS") may allow for the storage and retrieval of data that is distributed among multiple computing nodes. Data in a distributed DBMS may be organized into tables, which in turn may comprise collections of items sometimes described as table partitions. To improve the performance, reliability and availability of the system, each table partition may each be housed on a separate computing node that processes requests to store and retrieve the items it houses. A distributed database may also employ replication to maintain standby table partitions that may be employed in the event of a system failure.

Indexes may be described as data structures that allow items stored in a distributed DBMS to be located. They may, for example, allow items falling within a particular range of data to be located by scanning the index rather than searching through all of the items stored on one or more of the partitions. In order to maintain the integrity of an index with respect to data maintained in an associated table, entries in an index are updated based on changes made to corresponding data in the table. Indexes may also be partitioned, and there may be multiple indexes associated with a table.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1A:
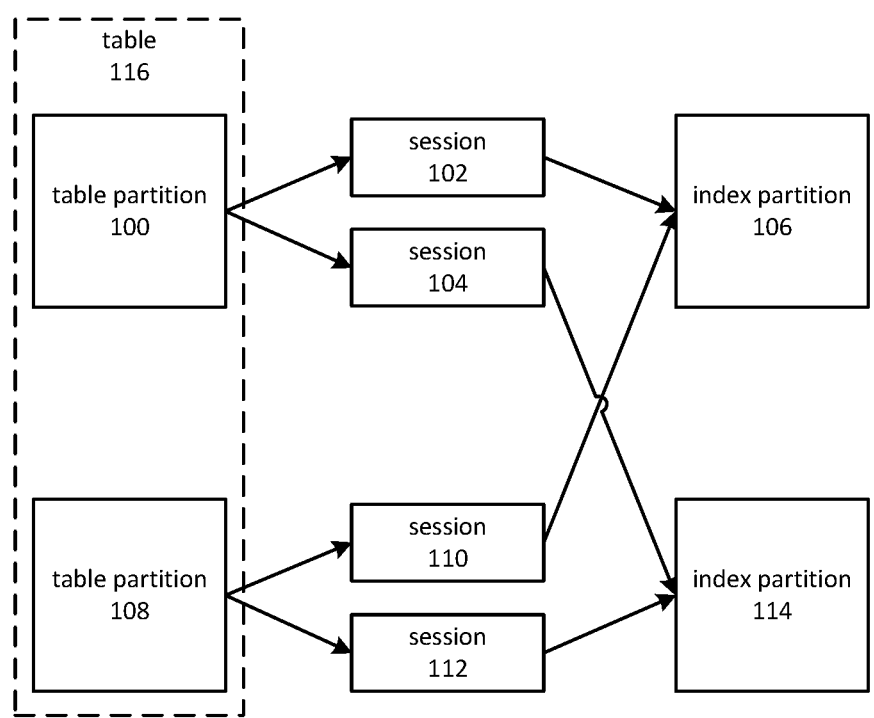
FIG. 1A is a block diagram depicting an example of a distributed database system comprising a table with two horizontal data partitions, two global indexes and one communications channel for each combination of table partition and index partition.

A distributed DBMS may maintain data organized by tables, each of which contains a collection of items, which may also be referred to as rows. The items may each comprise a set of name value pairs, a set of values identified by column names or undefined values. In various embodiments, individual items may not conform to any particular schema, and each item may accordingly contain a different number of values—each of which may have a different logical meaning and type. Values that have the same logical meaning and type, such as those identified by the same name or column, may for convenience be referred to as columns. Some embodiments of a DBMS may enforce various structural requirements, such as row and column format, uniqueness constraints, primary and foreign key relationships and the like.

The items in a table may be identified by key values. A primary key value, taken as a whole, uniquely identifies an item stored in the table. To access an item, a client of the distributed DBMS may issue a request that refers to a primary key value that corresponds to that item. Embodiments may also support access using secondary keys, which may not necessarily correspond to precisely one item in a table.

Primary and/or secondary keys may be defined to have an internal structure. In some embodiments a primary key's structure may consist only of a single value, while in other embodiment a primary key may comprise a composite of two or more values. For example, the primary key may be divided into two portions, a hash key and range key. Together, these portions of the primary key may reflect or define hierarchical relationships within a collection of items. A hash key may identify a group of items within the hierarchy while a range key identifies specific items within the group.

Distributed databases may employ various partitioning methods for reasons such as improving scalability. For example, to support large volumes of data and high workload demands, a distributed DBMS may partition the data in a table over a number of computing nodes. Each computing node might then handle a portion of the data storage and workload processing. Various forms of partitioning may be used. In horizontal partitioning, each computing node may maintain a subset of the collection of items. In vertical partitioning, data may be divided based on columns or fields, so that each computing node may contain a subset of the columns defined on the table. Some distributed DBMSs may combine these two forms of partitioning. The term "partition" may refer to one or more computing nodes hosting all or part of a table or index, such as an entire table or a partition of a table. The term "table partition" may be used to refer to one or more computing nodes that host all or part of a table. The term "index partition" may be used to refer to one or more computing nodes that host all or part of an index.

Various operations on data may be made more efficient through the use of index structures. An index may be based on a primary key, secondary keys or other values. An index may comprise one or more entries that are addressable by value. In various embodiments, an index might contain mappings from its entries to the storage location of an item maintained on a table partition. Operations performed on data maintained by the distributed DBMS may utilize an index to retrieve items from various storage locations.

Embodiments may include local indexes and global indexes. A local index may contain entries referring to items maintained in a single table partition, while excluding references to items maintained on other table partitions. A global index, on the other hand, may contain entries that refer to items maintained on any table partition. An index or portion of an index may be maintained on a computing node, which when maintaining an index or portion of an index may be referred to as an index partition. Embodiments may construct global indexes based on primary keys or on secondary keys. Updates to items maintained in a table partition may be sent via a communications channel to an index partition, so that changes to data in a table may be reflected in any corresponding indexes. Maintenance of a global index may involve each table partition for a given table communicating with one index.

Maintenance of indexes may involve communications over a network between table partitions and index partitions. There may be a significant number of table partitions communicating on a many-to-one basis with index partitions. Furthermore, in various embodiments there may be a large number of indexes. Embodiments may employ various techniques presented herein for communicating between table partitions and index partitions.

FIG. 1A depicts an example of a distributed database system with two horizontal data partitions and two global indexes. In the depicted example, a table 116 is horizontally partitioned into table partition 100 and table partition 108. A first index partition 106 may maintain a global index over some aspect of the data maintained in table 116, such as the primary key. A second index partition 114 may maintain a global index over some other aspect of the data, such as one or more columns other than a primary key.

Embodiments may employ sessions 102, 104, 110 and 112 for communication with index partitions 106 and 114. A single session may be employed for each path of communication between a table partition and an index. For example, table partition 100 may be associated with session 102 for communication with index partition 106, and session 104 for communication with index partition 114. Embodiments may therefore employ a number of sessions equal to the product of the number of table partitions and the number of index partitions.

A session may comprise various components for maintaining ordered communication for messages sent from table partitions to index partitions. The session may be configured to transmit messages in first-in, first-out order. Sessions 102, 104, 110 and 112 may, for example, function as message queues. In various embodiments, a session may be configured as a durable message queue, so that messages may not be lost due to various circumstances, such as network malfunction or power loss.

Figure 1B:
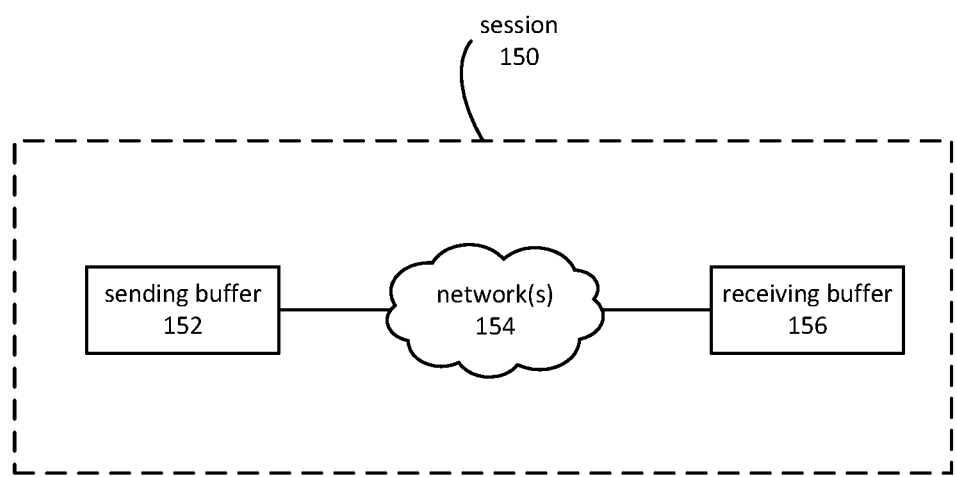
FIG. 1B is a block diagram depicting an example of a communications channel, between a table partition and an index partition, that utilizes a sending buffer and a receiving buffer.

FIG. 1B provides an example of an embodiment of a session 150. A sending buffer 152 may comprise a list of messages that may function as a queue, for example by allowing retrieval in first-in, first-out order. Some embodiments may utilize different ordering mechanisms, such as last-in, first-out or ordering based on priority.

Messages may be written to sending buffer 152 by a process operating on the table partition. The messages may be indicative of updates (including insertions, deletions and alterations) to items maintained on the sending table partition. A sending buffer 152 may incorporate various durability mechanisms to ensure that messages are not lost while being stored in sending buffer 152 or during transmission to receiving buffer 156. Various mechanisms may also be employed to prevent message duplication. Messages in sending buffer 152 may be sent in order to receiving buffer 156 via network(s) 154.

Figure 2:
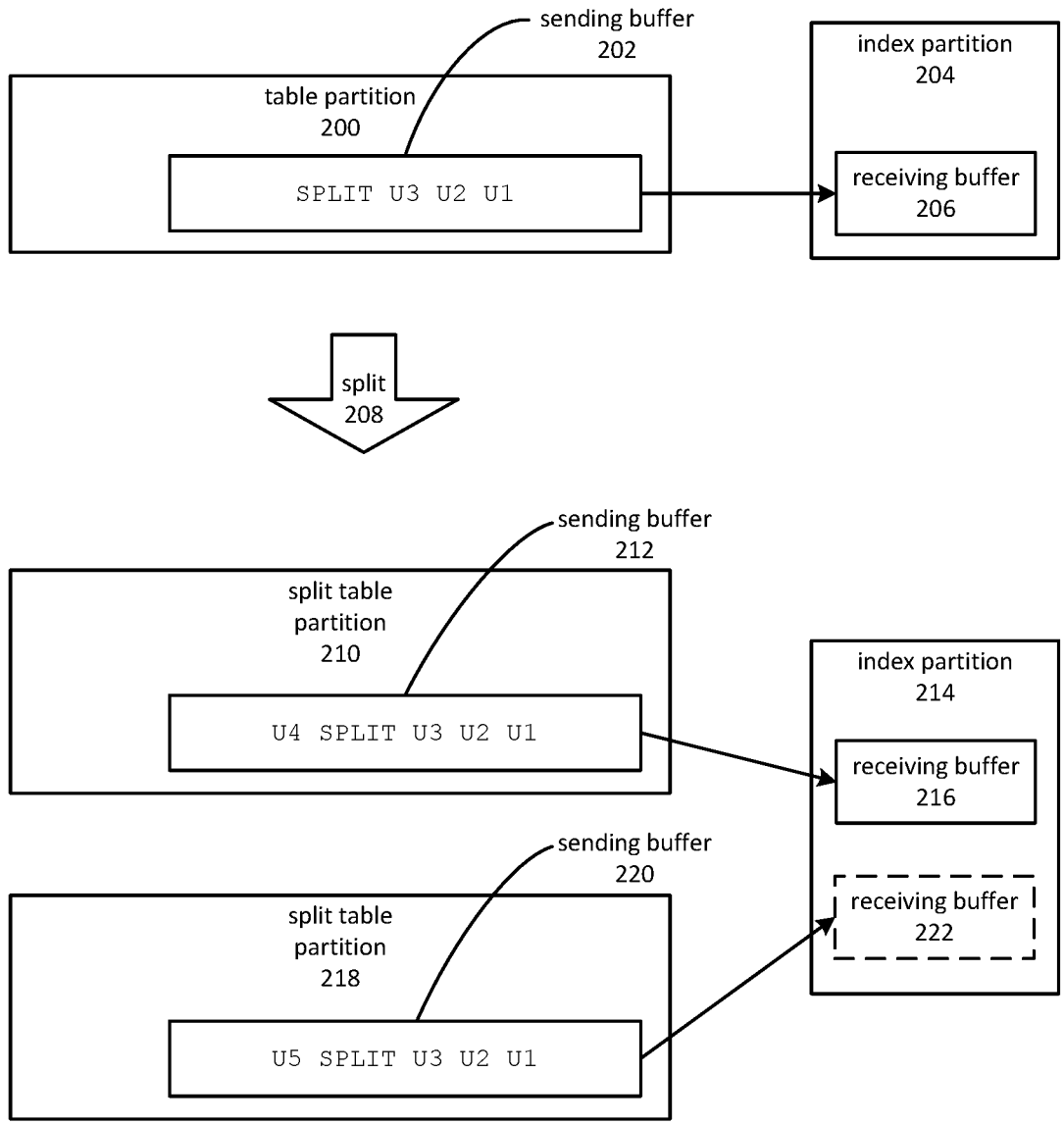
FIG. 2 is a block diagram depicting an example of managing communications between a table partition and index partitions while splitting a table partition.

Embodiments may perform operations to additional partitions from an existing partition. FIG. 2 depicts an example of splitting a table partition to form an additional partition, including aspects related to managing communications between table and index partitions.

Forming a new partition from an existing partition may be referred to as splitting the partition. The partition may contain a plurality of items that may be divided between two partitions according to the partitioning scheme. After partitioning, a first subset of the plurality may remain in the original partition, and a second subset may be moved to the new partition. Alternatively, two new partitions may be created. As used herein, splitting a table partition using either of these methods may be referred to as creating new partitions, even if an existing partition is retained by the process.

In FIG. 2, a table partition 200 may be associated with sending buffer 202. A communications session may comprise sending buffer 202 and receiving buffer 206 associated with index partition 204. Prior to splitting, sending buffer 202 may contain a number of unprocessed messages that have yet to be sent to index partition 204. These messages may describe various updates made to table partition 200 that may be used for corresponding updates to index partition 204. These are indicated in FIG. 2 as "U1," "U2" and "U3." Upon receiving an indication that table partition 200 is to be split, an additional message may be added to sending buffer 202, indicated as "SPLIT" in FIG. 2.

Forming new partitions from an existing partition is depicted as an arrow marked split 208 in FIG. 2. Performing the split may result in a first split table partition 210 and a second split table partition 218, each containing a subset of the items previously contained by table partition 200.

Each of the split table partitions 210 and 218 may form a separate communication session with index partition 214. For example, sending buffer 212 may be associated with receiving buffer 216 and sending buffer 220 may be associated with receiving buffer 222. In various embodiments, receiving buffer 206 may be retained for a period of time after the split, or reused. Embodiments may delay creating receiving buffers, or otherwise establishing new communications channels with split table partitions 210 and/or 218, until index partition 214 (corresponding to index partition 204 prior to the split) receives notification of the split. This may occur, for example, by receiving a "SPLIT" message as depicted in sending buffers 212 and 220.

In response to forming split table partitions 210 and 218 from table partition 200, embodiments may store copies of messages in sending buffer 202 in sending buffers 212 and 220. In some embodiments, sending buffer 202 may be reused to form sending buffer 212. In this case, adding copies of the messages to sending buffer 212 is incorporated into reusing sending buffer 212. Index partition 214 may ignore duplicate messages. For example, if "U1" has already been received at index partition 214 via sending buffer 212 and receiving buffer 216, it may be ignored if subsequently received at index partition 214 via sending buffer 220 and receiving buffer 222.

New updates to the items maintained on the table partitions may continue to arrive during and after the splitting process. These new updates may be added to one of sending buffer 212 or to sending buffer 220 based on a corresponding partitioning scheme. For example, if split table partitions 210 and 218 are split based on alphabetical order, message "U4" might be placed in sending buffer 212 if it corresponds to an update of a record beginning with "A," while "U5" might be placed in sending buffer 220 if it corresponds to an update of a record beginning with "Z."

Figure 3:
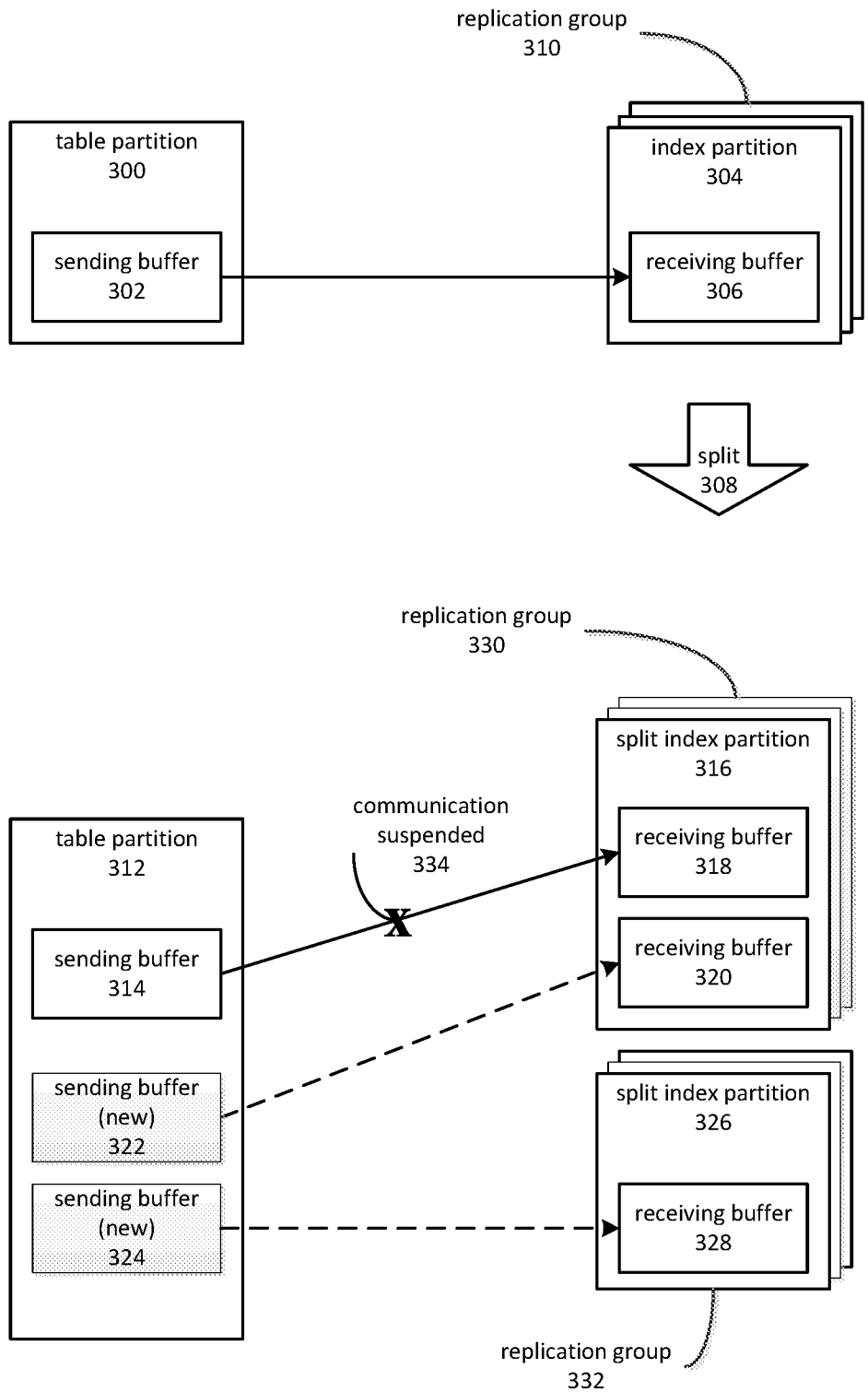
FIG. 3 is a block diagram depicting an example of managing communications between a table partition and index partitions while splitting an index partition.

Index partitions may also be split independently of table partitions, and in some cases and embodiments may also be split while a table split is also underway. FIG. 3 depicts an example of splitting an index partition 304 into split index partitions 316 and 326. Initially, a table partition 300 may transmit a stream of updates to index partition 304. Messages describing the updates may be stored in sending buffer 302 for transmission to index partition 304, which may store the messages in receiving buffer 306 prior to applying the updates.

Index partition 304 may be part of replication group 310, which may involve additional index partitions that mirror the contents of index partition 304. In the example of FIG. 3, index partition 304 may be the designated master of replication group 310. The designated master may transmit updates received from table partition 300 to other members of replication group 310.

An operation forming split index partitions 316 and 326 is depicted by the arrow marked split 308 in FIG. 3. Each of split index partitions 316 and 326 may contain a subset of the entries contained in index partition 304 prior to the split. The subset of entries may, in a manner similar to tables, be based on a horizontal or vertical partition of the data.

Based on initiating the index splitting operation, communication involving sending buffer 314 on table partition 312 and receiving buffer 318 may be suspended, as indicated by element 334 in FIG. 3. In some embodiments, this may happen when a message is received for storage in receiving buffer 306 by index partition 304, or a replacement of index partition 304, subsequent to initiating the index split. In some cases and embodiments, index partition 304 and split index partition 316 may be the same entity, or in other words embodiments may reuse index partition 304 when forming split index partition 316. A message might therefore be sent to split index partition 316 that was originally intended to be received by index partition 304. In response to receiving the message from a pre-existing communication session, split index partition 316 might respond with an indication that an index split is underway and that further communication in that session should be halted.

Split index partition 326 may be formed as part of replication group 332, which may be separate from replication group 310. Embodiments may designate a new master for each of the new replication groups 330 and 332. Note that replication group 330 may be the same entity as replication group 310, depending upon how split index partition 316 was formed from index partition 304. In various cases, the same partition that was a master partition prior to the split may again serve as a master after the split.

Communication between table partition 312 and split index partitions 316 and 326 may be reestablished by forming two communication channels. One communication channel may comprise sending buffer 322 on table partition 312 and receiving buffer 320 on split index partition 316. A second communications channel could comprise sending buffer 324 on table partition 312 and receiving buffer 328 on split index partition 326. Forming the communications channels may comprise various operations, including a determination of which index partitions in replication groups 330 and 322 have been designated as master for its replication group. Communication between table partition 312 and either of split index partitions 316 and 326 may be initiated in either direction. Various mechanisms may be employed to establish communication, including direct contact, contact between a table partition and multiple index partitions, contact between an index partition and multiple table partitions, broadcast messages and contact through an intermediary process such as a connection broker.

Due to potentially large quantities of data, high workload demand and other factors, table splitting and index splitting operations may involve considerable latency. As a result, in various cases and embodiments the events and operations related to splitting tables and splitting indexes may overlap. The techniques and mechanisms described herein for managing communication during table splitting and index splitting may be employed to preserve index integrity during and after these operations.

Figure 4:
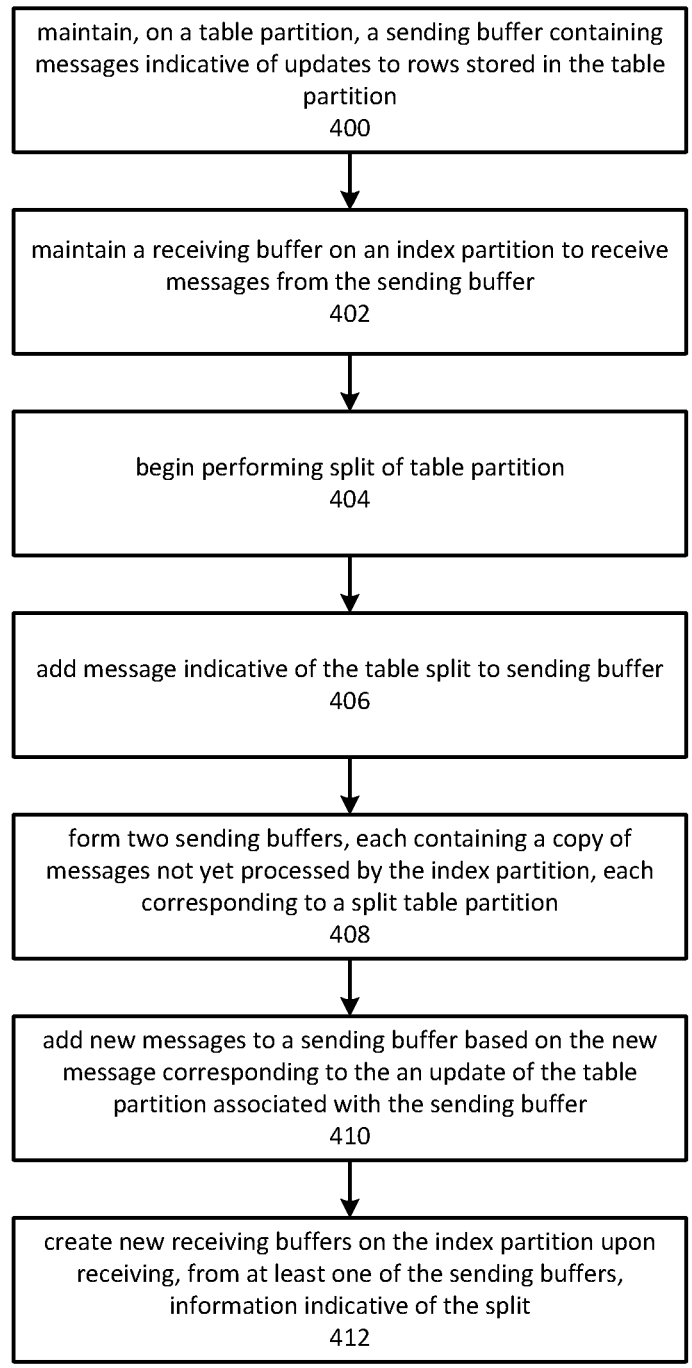
FIG. 4 is a flowchart depicting an example process for managing sending and receiving buffers in communications channels between table partitions and index partitions while splitting a table partition.

FIG. 4 depicts an embodiment of a process for managing communications between a table partition and an index partition during and after a table splitting operation. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 400 depicts maintaining a sending buffer on a table partition. The sending buffer may act as a first-in, first-out queue of messages. The messages may be indicative of updates to items of data maintained on the table partition. The messages may be sent to a receiving buffer on an associated index partition. Operation 402 depicts maintaining a receiving buffer on an index partition, configured to receive messages send via the sending buffer on the table partition.

The paired sending and receiving buffers depicted in FIG. 4 may be considered a type of communication session or communications channel between a table partition and an index partition. Embodiments may also employ alternative mechanisms for communication, such as a single buffer maintained in a shared memory location. As used herein the term "communications channel" includes any type of communications session or other communication mechanism.

Operation 404 depicts the initiation of splitting a table partition. In various cases, splitting operations may overlap. For example, a first partition might begin splitting into a second and third partition. Prior to completion of the split, the second partition might split into a fourth and fifth partition. In other cases, an index split may occur during a table split, or a table split during an index split.

At operation 406, a message indicative of the table split may be added to the sending buffer. The message may indicate that a split has been initiated. The message may, in some embodiments, include additional information such as a description of the split point, information about the partitioning scheme and so on.

The existing sending buffer may be replaced by multiple sending buffers, each corresponding to a post-split table partition. Operation 408 depicts forming two such buffers. Each sending buffer may be populated with copies of the unsent messages that were contained in the sending buffer prior to forming the new buffers. In various embodiments, a new buffer may be formed from an existing buffer, and therefore creating a new buffer may be equivalent to repurposing an existing buffer. A sending buffer may be maintained on the table partition to which it is related. Embodiments may transmit the contents of an existing buffer from the pre-split table partition to any new partitions. In other embodiments, the sending buffers may be maintained in a single location, such as on the pre-split table partition or on a computing node remote to the table partitions.

A buffer may be formed on a computing node remote to the computing node maintaining the initial sending buffer. In such cases, the contents of the buffer may be transmitted over a network to the remote computing node. In some embodiments, forming a copy of a buffer on a remote machine may be performed by shipment of log information. Log information may be broadcast prior to formation of the buffer of the remote machine, which may result in a reduction in the amount of time used to form the buffer.

In some embodiments, a table partition may be a member of a replication group comprising a table partition designated as a master of its replication group, and one or more replication partners. A new partition may be elected to serve as a master of its replication group during or as a result of splitting a table partition. In such cases, embodiments may establish communications channels, associated with the sending buffers, between the elected table partition and index partitions. In various cases, the table partition elected as master of its replication group may be the same partition that was a master prior to the split.

New messages may be added to one of the sending buffers based on the split points or other partitioning criteria associated with the corresponding table partition. As depicted by operation 410, a message may be added to a sending buffer when the message corresponds to an update of a row contained within the table partition associated with the sending buffer.

Embodiments may employ a variety of techniques to create receiving buffers corresponding to each sending buffer, or to otherwise establish one communications channel or session for each unique combination of table partition and index partition. Operation 412 depicts one such technique, in which receiving buffers are created upon receiving information indicative of the split. This may occur, for example, by the index partition continuing to receive messages from one of the new buffers through an existing communications channel, such as through the preexisting receiving buffer maintained in the index partition. In some embodiments, one of the sending buffers formed in operation 408 may be a retained version of a preexisting sending buffer.

Figure 5:
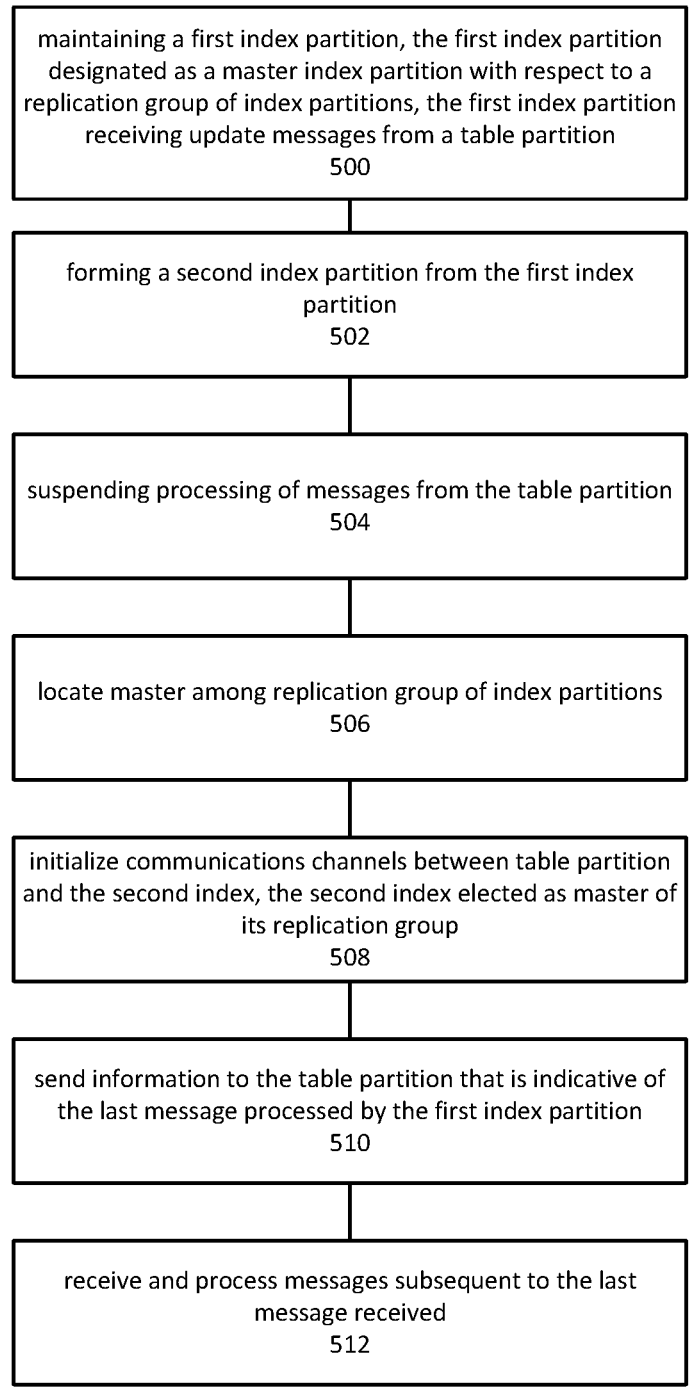
FIG. 5 is a flowchart depicting an example of a process for managing sending and receiving buffers in a communications channel between table partitions and index partitions while splitting an index partition.

FIG. 5 depicts an embodiment of a process for splitting an index partition, which may in various embodiments be initiated in response to the splitting of an associated table, or independently of table splitting. In some cases and embodiments, table splitting and index splitting may occur in parallel by employing aspects of the present disclosure. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 500 depicts maintaining a first index partition, which may serve as a master in a replication group. A replication group may comprise a master index partition and additional partitions that mirror the content of the master. The partition elected as master may receive messages from a table partition to be applied to update the contents of the index. The updates may be applied to the index maintained by the master and propagated to other members of the replication group.

Operation 502 depicts forming a second index partition from the first index partition. The newly formed second index partition may comprise a subset of the entries maintained in the first index partition prior to splitting, such that entries are split between the new index partition and the first index. In some cases and embodiments, the first index may be split into a plurality of new index partitions, such that the first index's entries are divided between the new indexes, which then replace the first index. Entries may be subdivided based on various horizontal or vertical partition criteria, including partitioning criteria utilized by the table partition, or table partitions, with which the first index was associated. The second index partition may also be formed as part of a replication group.

Upon initiating a process for splitting the initial index, embodiments may suspend communication between the table partition and the first index partition. This is depicted in FIG. 5 by operation 504. Suspending communication may include responding to messages sent from the table partition with information that indicates that a table split is in progress. In some embodiments, an index partition may receive a message from a table partition, and respond to the message with information that indicates that an index split is in progress, or that indicates that the index partition is no longer serving as a master in a replication group. In some embodiments, suspending communication may involve terminating a communications channel between the table and index partitions.

While communication is suspended, updates to table partitions associated with the index may accumulate in a sending buffer or other mechanism associated with the table partition. The sending buffer may be configured to have sufficient storage capacity for at least a minimum amount of time, where the minimum amount of time correlates to factors such as the expected time for an index partitioning operation to complete.

Operation 506 depicts locating index partitions to serve as masters for a replication group of index partitions. Embodiments may form a new replication group for the new index partition, from which a master is selected. In cases where the first index partition is not replaced with a new partition, embodiments may also select a new master from the existing replication group. The selected master may, however, be the same index partition that previously served as a master.

Operation 508 depicts initializing new communications channels. A new communications channel may be initialized for each new index partition, including any index partitions that were reused. The communications channels may comprise a channel between the table and the designated master of the replication group associated with the first index partition, and a second channel between the table and the designated master of the replication group associated with the second index partition. The communications channel may include sending and receiving buffers as described herein. A table partition may create one sending buffer for each index partition with which it communicates. An index partition may create one receiving buffer for each table partition with which it communicates.

In various cases and embodiments, communications between a table partition and an index partition may be initiated by either the table partition or the index partition. For example, after communications have been suspended, as depicted by operation 504, a table partition may periodically poll a mechanism for locating a table partition with which it should communicate. An index partition, upon being designated as a master, might seek out a corresponding table partition. In general terms, communications between table and index partitions may be established through one or more of the following mechanisms. First, direct contact may be made between two partitions, such as between a table partition and an index partition elected as a master that the table partition had previously been communicating with. Second, broadcast messages may be employed, such as between a table partition and all known indexes in a replication group, or between an index partition and all known table partitions in a replication group of table partitions. Third, communication may be established in conjunction with an intermediary, such as a metadata repository containing information indicate tables corresponding to an index or master designations for replication groups. Another example of an intermediary is a connection-broker process.

Operation 510 depicts sending information to the table partition with which an index communicates, in which the information is indicative of the last message from the table that was processed by the first index. The first index and the second index may each send a message with this information in order to initiate transmission of messages that have not yet been processed by applying the updates to either the first index or the second index. The information may comprise a log serial number ("LSN"). The information may also comprise identification information pertaining to the index partition sending the message, or information describing the partitioning scheme applicable to the index partition. A table partition, upon receipt of a message comprising the information, may transmit unprocessed updates to the index partition. The table partition may filter outgoing messages so that updates that are not applicable to the requesting index are not transmitted. Operation 512 depicts an index partition receiving the transmitted messages and applying them.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 6:
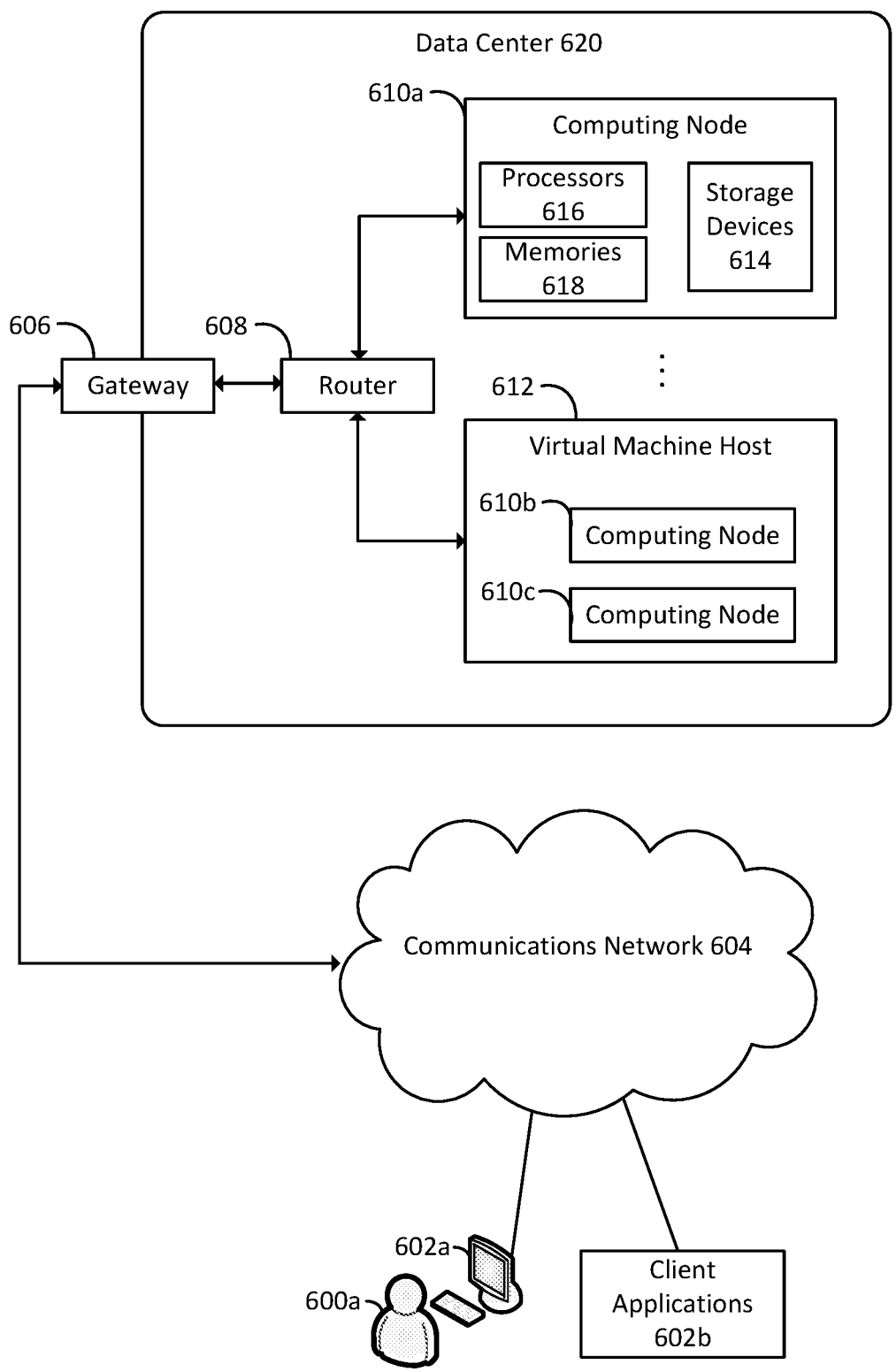
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b and 610c within a data center 620. Alternatively, client applications 602b may communicate without user intervention. Communications network 604 may comprise any combination of communications technology, including the Internet, wired and wireless local area networks, fiber optic networks, satellite communications and so forth. Any number of networking protocols may be employed.

Communication with processes executing on the computing nodes 610a, 610b and 610c, operating within data center 620, may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b and 610c. Some of these intermediate layers may themselves comprise processes executing on one or more of the computing nodes. Computing nodes 610a, 610b and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618 or storage devices 614.

Computing nodes 610b and 610c are depicted as operating on virtual machine host 612, which may provide shared access to various physical resources such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tables, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
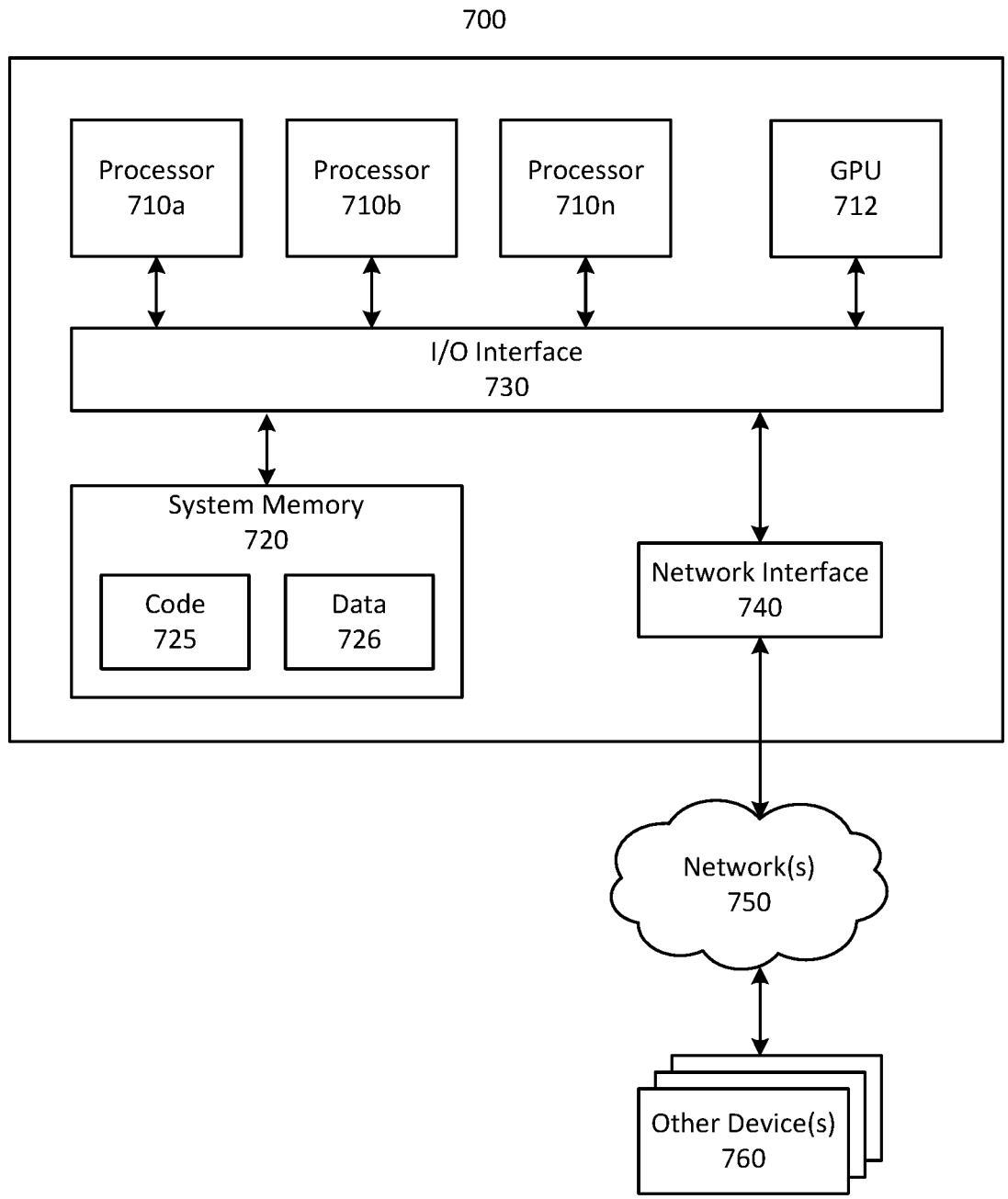
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710*a*, 710*b* and/or 710*n* (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 910 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device. A GPU may also be configured to execute instructions that, when executed, practice aspects of the present disclosure.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms;

furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   at least one processor; and
   at least one memory comprising instructions that, in response to execution by the at least one processor, cause the system to at least:
   store a plurality of messages describing updates to a table partition;
   receive information indicative of splitting an index partition comprising an index of the table partition into at least a first index partition and a second index partition;
   initiate, in response to the splitting, a second channel for communication between the table partition and the second index partition; and
   send the stored plurality of messages describing updates to the table partition to both of the first index partition over a first channel and the second index partition over the second channel, wherein:
   the first channel communicates the updates from a sending buffer of the table partition to a first receiving buffer of the first index partition, and
   the second channel communicates the updates from the sending buffer of the table partition to a second receiving buffer of the second index partition.

2. The system of claim 1, wherein the plurality of messages pertain to a time period before splitting of the index partition.

3. The system of claim 1, comprising further instructions, that, in response to execution by the at least one processor, further cause the system to:
   suspending communication between the table partition and the first index partition prior to splitting the index partition.

4. The system of claim 1, wherein after splitting the index partition, the first index partition refers to a first subset of items stored in the table partition, and the second index partition refers to a second subset of items stored in the table partition.

5. The system of claim 1, wherein the plurality of messages are received prior to splitting the index partition.

6. A computer-implemented method, comprising:
   storing a plurality of messages describing updates to a table partition;
   receiving information indicative of splitting an index of the table partition into at least a first index partition and a second index partition;
   initiating a second channel for communication between the table partition and the second index partition; and
   sending the stored plurality of messages describing updates to the table partition to at least the first index partition over a first channel and the second index partition over the second channel, wherein the stored plurality of messages are sent:
   from a sending buffer of the table partition to a first receiving buffer of the first index partition, and
   from the sending buffer of the table partition to a second receiving buffer of the second index partition.

7. The computer-implemented method of claim 6, wherein the plurality of messages are received prior to splitting the index.

8. The computer-implemented method of claim 6, further comprising:
   suspending communication between the table partition and the first index partition prior to splitting the index.

9. The computer-implemented method of claim 6, wherein after splitting the index, the first index partition refers to a first subset of items stored in the table partition, and the second index partition refers to a second subset of items stored in the table partition.

10. The computer-implemented method of claim 6, wherein transmitting the plurality of messages to the first and second index partitions is based at least in part on information indicating a last message processed by the first index partition.

11. The computer-implemented method of claim 6, further comprising:
    receiving, from the first index partition, a message indicating that an index split is underway.

12. The computer-implemented method of claim 6, wherein the second index partition is a master of a replication group.

13. The computer-implemented method of claim 6, wherein communication between the table partition and the second index partition is initiated based at least in part on a message sent by the second index partition.

14. A non-transitory computer-readable storage medium having stored thereon instructions that, upon execution by one or more computing devices, cause the one or more computing devices at least to:
  store a plurality of messages describing updates to a table partition;
  receive information indicative of splitting an index partition of the table partition into at least a first index partition and a second index partition;
  initiate a second channel for communication between the table partition and the second index partition; and
  send the stored plurality of messages describing updates to the table partition from a sending buffer of the table partition to at least a first receiving buffer of the first index partition over a first channel and a second receiving buffer of the second index partition over the second channel.

15. The non-transitory computer-readable storage medium of claim 14, comprising further instructions that, upon execution by the one or more computing devices, cause the one or more computing devices to at least:
  suspend communication between the table partition and the first index partition prior to splitting the index partition.

16. The non-transitory computer-readable storage medium of claim 14, wherein after splitting the index partition, the first index partition refers to a first subset of items stored in the table partition, and the second index partition refers to a second subset of items stored in the table partition.

17. The non-transitory computer-readable storage medium of claim 14, wherein transmitting the plurality of messages to the first and second index partitions is based at least in part on information indicating a last message processed by the first index partition.

18. The non-transitory computer-readable storage medium of claim 14, comprising further instructions that, upon execution by the one or more computing devices, cause the one or more computing devices to at least:
  receive, from the first index partition, a message indicating that an index split is underway.

19. The non-transitory computer-readable storage medium of claim 14, wherein the second index partition is a master of a replication group.

20. The non-transitory computer-readable storage medium of claim 14, wherein communication between the table partition and the second index partition is initiated based at least in part on a message sent by the second index partition.

* * * * *